March 26, 1940.　　　J. C. WEAVER　　　2,194,880
AUTOMOBILE SPEED GOVERNOR
Filed Feb. 10, 1939　　　2 Sheets-Sheet 1
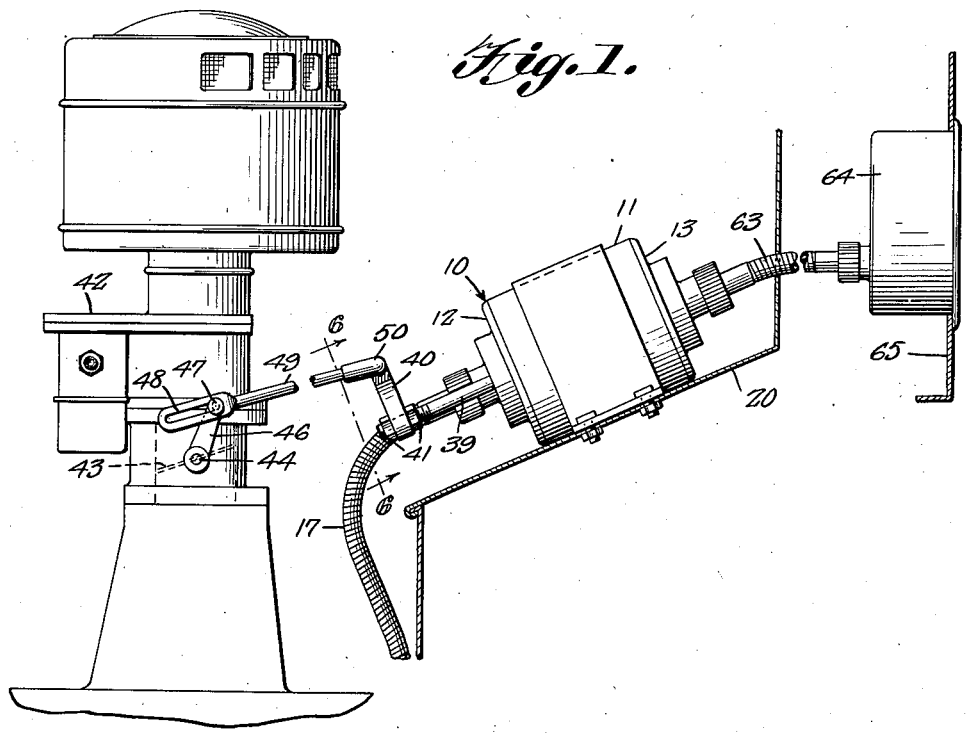
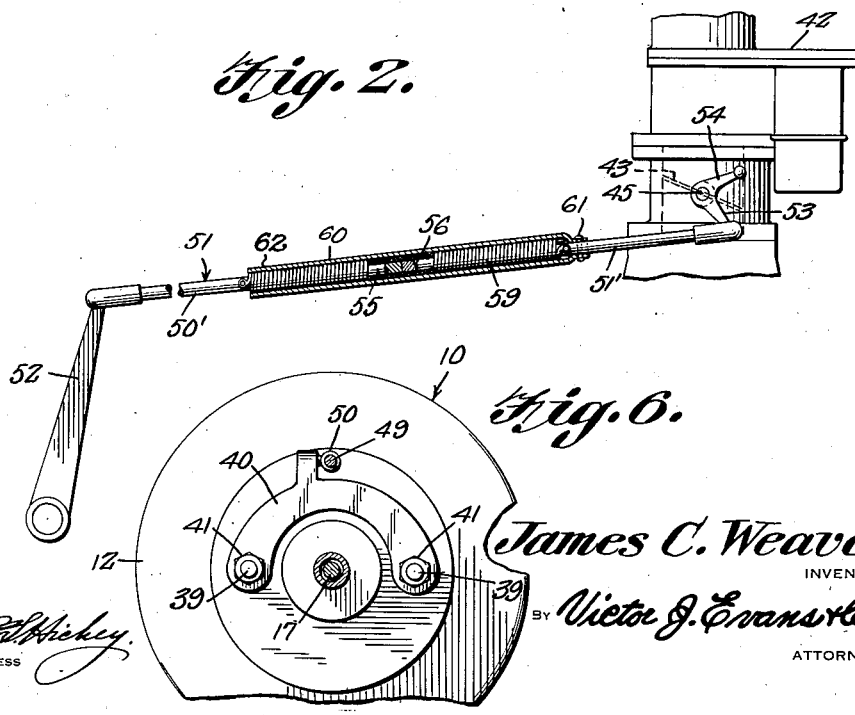
James C. Weaver,
INVENTOR
WITNESS　　　BY Victor J. Evans & Co.
ATTORNEYS James C. Weaver,
INVENTOR Patented Mar. 26, 1940

2,194,880

UNITED STATES PATENT OFFICE 2,194,880

AUTOMOBILE SPEED GOVERNOR

James C. Weaver, Harrisburg, Pa., assignor to Samuel Snyder and Jacob A. Miller, both of Harrisburg, Pa., and Harry Zook, Lancaster, Pa.

Application February 10, 1939, Serial No. 255,749

3 Claims. (Cl. 180—82.1)

My invention relates to a device for controlling the speed of an automotive vehicle.

An important object of my invention is the provision of a device whereby the maximum acceleration of the vehicle may be effectively controlled and regulated.

Another object of my invention is the provision of a device for controlling the speed of the vehicle with certainty and efficiency.

Yet another object of my invention is the provision of a device for controlling the speed of a vehicle wherein the breaking of parts due to the action of the governor will be prevented.

Still another object of my invention is the provision of a device for controlling the speed of a vehicle that is simple in construction, efficient in operation and inexpensive to manufacture.

Other objects and advantages of my invention will be apparent during the course of the following description.

Figure 3:
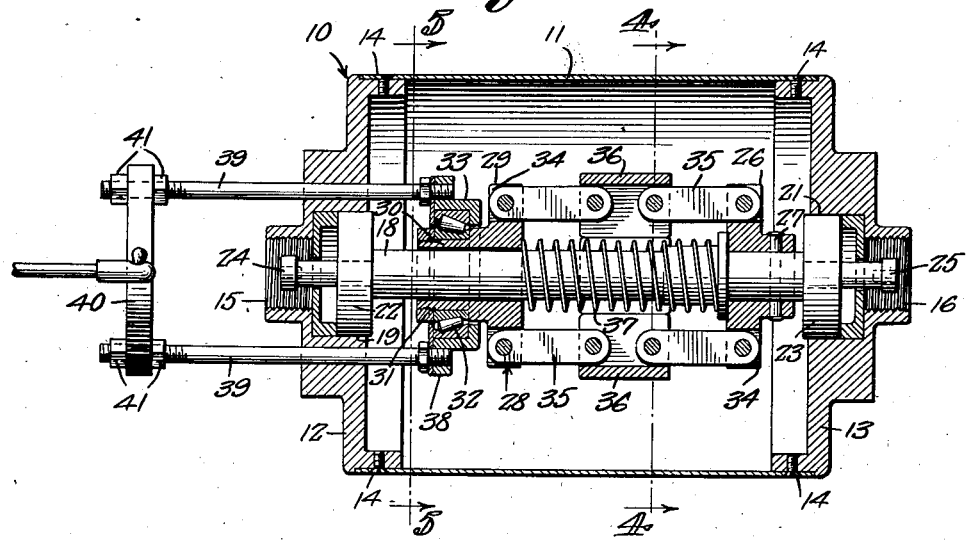
Figure 4:
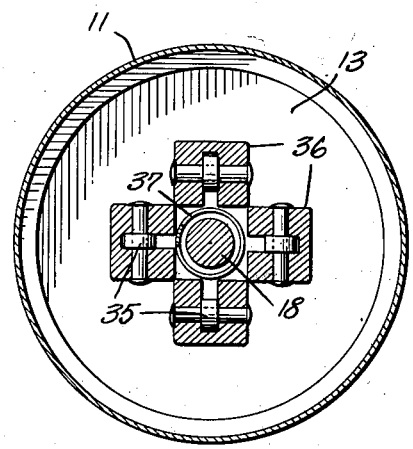
Figure 5:
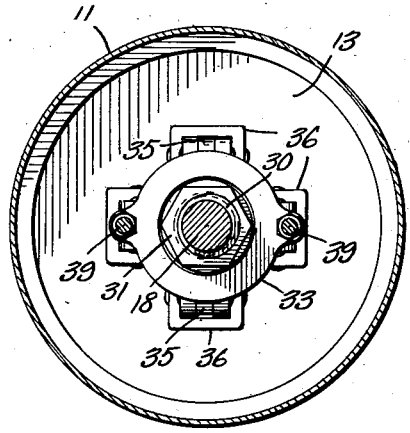

In the drawings, forming a part of this specification, and in which like numerals are employed to designate like parts throughout the same, Figure 1 is a side elevation of my device, and shows its association with a carburetor and speedometer of an automotive vehicle, Fig. 2 is a side view, showing parts in elevation and parts in section, of the accelerator control rod, Fig. 3 is a longitudinal sectional view of the governor embodying a part of my invention, Fig. 4 is a transverse sectional view, taken on the line 4—4 of Fig. 3, Fig. 5 is a transverse sectional view, taken on the line 5—5 of Fig. 3, and Fig. 6 is a transverse sectional view, taken on the line 6—6 of Fig. 1.

In the accompanying drawings, wherein for the purpose of illustration, is shown a preferred embodiment of my invention, the numeral 10 designates a governor fastened to the support 20 of an automobile (not shown) and which comprises a cylindrical shell 11 having transverse closure walls 12 and 13 secured in either end thereof by means of the screws 14, or the like. The end walls 12 and 13 have centrally disposed, longitudinally aligning openings 15 and 16 which are internally screw-threaded to receive the fittings carried on the ends of the speedometer cable 17. The spindle 18 is formed at either end with annular bearings 22 and 23 which are rotatably mounted in the inner annular recesses 19 and 21 provided in the end walls 12 and 13 and extending longitudinally thereof, into the central openings 15 and 16, are shanks 24 and 25 to which the ends of the speedometer cable are securely fastened. A fixed collar 26 is carried by the spindle 18 adjacent the annular bearing 23, said collar being held thereon, for rotation therewith, by means of the transversely extending rivet 27. A sliding collar 28 is carried by the spindle 18 adjacent the annular bearing 22. The sliding collar 28 is formed with an annular flange 29 and an outwardly extending shank 30, the end of which is screw-threaded to receive the nut 31 which holds the roller bearing 32 on the shank and in abutting relation with a retaining cap 33. The fixed collar 26 and the sliding collar 28 are provided with diametrically opposed, right angularly disposed, recesses 34 in which the outer ends of the links 35 are pivotally received, and a coil spring 37 is carried by the spindle 18 between the fixed collar 26 and the sliding collar 28. The resilient action of the spring 37 maintains the slidable collar 28 normally spaced a maximum distance from the fixed collar 26, and with the link members 35 longitudinally aligned to hold the weights 36 in close proximity to the spindle 18. The retaining cap 33 is formed with a lower annular flange 38 which is provided with diametrically opposed openings to threadedly receive the inner ends of the rods 39 which extend outwardly therefrom through the transverse end wall 12. The rods 39 have a slidable engagement with the end wall and the outer extremities thereof are joined by a yoke 40 which is retained thereon by lock nuts 41.

A portion 63 of the speedometer shaft extends from the shank 25 of the spindle 18 to engage a speedometer 64 carried on the dash 65 of the automobile.

The carburetor 42 of the vehicle is provided with the conventional butterfly valve 43 in the suction chamber thereof, and the valve 43 is formed with shanks 44 and 45 projecting exteriorly of the carburetor casing at diametrically opposed sides thereof. The shank 44 of the valve has a lever arm 46 fastened thereon exteriorly of the carburetor, and the free end of the arm 46 is provided with a laterally extending shank 47 which is slidably and pivotally received in the elongated slot 48 of the connecting rod 49. The opposite end 50 of the connecting rod 49 is attached to the yoke 40.

The accelerator rod 51 comprises longitudinally aligning sections 50' and 51' thereof and the section 50' is attached to the free end of the accelerator lever 52. The section 51' is fastened to the arm 53 of a bell crank lever 54 which is secured to the shank 45 of the butterfly valve 43. The free ends 55 and 56 of the sections 50' and 51' are arranged in abutting relation. The spring 59 is carried by the accelerator rod 51 intermediate the ends thereof and the opposite ends of the said spring are secured to each of the sections 50' and 51' to normally hold the ends 55 and 56 in longitudinal abutting engagement. A tubular member 60 substantially encloses the spring 59 and the end 61 thereof is firmly attached to the section 51'. The opposite end 62 of the member 60 is unattached to permit a longitudinal sliding movement of the section 50' independently of the section 51'.

The operation of my device is as follows:

If the weights 36 in the governor are adapted to limit the acceleration of the vehicle to forty miles an hour, the driver of the vehicle may actuate the accelerator lever until that speed is attained, at which point my device becomes operative to limit further acceleration. The flexible speedometer cable 17 is engaged for rotation with the transmission shaft and will impart this rotation to the spindle 18 of the governor 10. As the transmission shaft revolves faster due to increased acceleration of the vehicle, the speed of rotation of the spindle 18 will increase accordingly, and inasmuch as the collars 26 and 28 are mounted for rotation with the spindle, a considerable centrifugal force will be exerted upon the weights 36 which will tend to fly away from the spindle and, in so doing, will pull the sliding collar 28 toward the fixed collar 26 against the resilient action of the spring 37. As the vehicle attains the arbitrarily selected speed limit of forty miles per hour, the sliding collar 28 is moved inwardly on the spindle 18 toward the fixed collar 26, and the retaining cap 33 attached thereto and movable therewith will move the yoke 40 positioned on the outer extremities of the rods 39 toward the end wall 12 of the governor. This motion will be transmitted to the rod 49 which will move inwardly to cause the laterally extending pin 47 of the lever arm 46 to engage with the outer end of the elongated slot 48 to limit the further actuation of the butterfly valve 43.

The operation of the mechanism hereinbefore described will act as a positive lock on the carburetor to prevent the further movement of the valve and consequently will prevent the further acceleration of the vehicle.

I have found that the provision of a positive locking co-action between the accelerator mechanism and the carburetor frequently results in a breaking or distorting of parts connected thereto. To prevent this from occurring, I have provided the dual accelerator rod 51 which connects the butterfly valve 43 of the carburetor to the foot actuated accelerator on the floor board of the vehicle. When the shank 47 engages the end of the slot 48 to positively lock further movement of the valve, a further pressure exerted on the foot accelerator will effect considerable stress on the parts.

In my device, if an attempt is made to further depress the accelerator, the free ends 55 and 56 of the accelerator rod will move longitudinally away from each other against the resilient action of the tension spring 59. Under ordinary conditions, the spring 59 will hold the ends 55 and 56 of the rod 50 in abutting engagement to permit actuation of the valve, and as soon as the accelerator foot pedal is released, the spring 59 will once more cause the ends of the accelerator rod to abuttingly engage.

It may thus be seen that I have provided a certain and efficient control to govern the speed of the vehicle, and that I have incorporated a means for preventing breaking or distortion of parts caused by the positive locking action of the speed control.

It is to be understood that the form of my invention, herewith shown and described, is to be taken as a preferred example, of the same, and that various changes in the size, shape and arrangement of parts may be resorted to without departing from the spirit of my invention or the scope of the appended claims.

By thus describing my invention, I claim:

1. In a motor vehicle having a speedometer shaft and an engine having a carburetor provided with a throttle valve, the combination of a governor mechanism mounted on the vehicle and connected to the speedometer shaft to be actuated thereby, a rod connected to the governor mechanism and having a slidable and pivotal engagement with the throttle valve, a rod connecting the throttle valve to an accelerator mechanism and being transversely severed intermediate its ends, a tubular member slidably disposed on the rod to hold the severed ends thereof in longitudinal alignment, and resilient means to normally hold the severed ends frictionally engaged with each other but permitting the disengagement thereof when the said throttle valve is locked by the governor mechanism and pressure is applied to the said accelerator mechanism.

2. In a motor vehicle having a speedometer shaft and an engine having a carburetor provided with a throttle valve, the combination of a governor mechanism mounted on the vehicle and connected to the speedometer shaft to be actuated thereby, a rod connected to the governor mechanism and having a slidable and pivotal engagement with the throttle valve, a rod pivotally attached to the said throttle valve, a rod pivotally attached to an accelerator mechanism, the free ends of the said rods having an abutting engagement with each other, spring means to hold the free ends of the said rods in abutting engagement, and a tubular member enclosing the said spring means and having one end attached to one of the rods, the other of the said rods being slidable therein against the resilient action of the said spring means.

3. In a motor vehicle having a speedometer shaft and an engine having a carburetor provided with a throttle valve, the combination of a governor mechanism mounted on the vehicle and connected to the speedometer shaft to be actuated thereby, a lever fastened to the throttle valve and movable therewith, a rod connected to the governor mechanism and having a slidable and pivotal engagement with the said lever, an arm fastened to the throttle valve, a rod pivotally attached to the said arm, a rod pivotally attached to an accelerator mechanism, the free ends of the said last-mentioned rods having an abutting engagement with each other, spring means to hold the free ends of the said rods in abutting engagement, and a tubular member enclosing the said spring means and having one end attached to one of the rods, the other of the said rods being slidable therein against the resilient action of the said spring means.

JAMES C. WEAVER.